(12) United States Patent
Richardson

(10) Patent No.: US 11,400,518 B2
(45) Date of Patent: Aug. 2, 2022

(54) ADDITIVE LAYER MANUFACTURING APPARATUS WITH PROCESS MONITORING FACILITY

(71) Applicant: Reliance Precision Limited, Huddersfield (GB)

(72) Inventor: William Thomas Richardson, West Yorkshire (GB)

(*) Notice: Subject to any disclaimer, the term of this patent is extended or adjusted under 35 U.S.C. 154(b) by 235 days.

(21) Appl. No.: 16/479,319

(22) PCT Filed: Jan. 5, 2018

(86) PCT No.: PCT/GB2018/000003
§ 371 (c)(1),
(2) Date: Jul. 19, 2019

(87) PCT Pub. No.: WO2018/134555
PCT Pub. Date: Jul. 26, 2018

(65) Prior Publication Data
US 2019/0375010 A1    Dec. 12, 2019

(30) Foreign Application Priority Data

Jan. 20, 2017 (GB) ..................... 1701088

(51) Int. Cl.
*B22F 10/30* (2021.01)
*B29C 64/153* (2017.01)
(Continued)

(52) U.S. Cl.
CPC ............ *B22F 10/30* (2021.01); *B29C 64/153* (2017.08); *B29C 64/268* (2017.08); *B29C 64/35* (2017.08); *B22F 10/10* (2021.01)

(58) Field of Classification Search
CPC ..... B29C 64/153; B29C 64/268; B29C 64/35; B22F 10/30; B33Y 30/00; G02B 27/0006
See application file for complete search history.

(56) References Cited

U.S. PATENT DOCUMENTS 8,075,814 B2 * 12/2011 Fruth .................... B33Y 30/00
264/39
80,785,814       12/2011 Fruth et al.
(Continued)

FOREIGN PATENT DOCUMENTS

CN          104526149 A     4/2015
CN          105499567 A     4/2016
WO    WO-2014090510 A1 *  6/2014  ............. B22F 10/20

OTHER PUBLICATIONS

Diniwiddie et al. "Thermographic in-situ process monitoring of the electron-beam melting technology used in additive manufacturing", May 22, 2013, Proc. SPIE, 8705, 87050K-1-9. (Year: 2013).*
Crystal Systems Inc. "Sapphire : Physical & Mechanical Properties", 2007, http://www-eng.lbl.gov/~shuman/NEXT/MATERIALS& COMPONENTS/Quartz/Sapphire_Physical_Mechanical_Properties.pdf (Year: 2007).*
(Continued)

*Primary Examiner* — Joseph S Del Sole
*Assistant Examiner* — Ariella Machness

(57) ABSTRACT

Additive layer manufacturing apparatus utilizing a housing, which bounds a vacuum chamber and has a window for monitoring a region of the chamber in which additive layer manufacturing is to be carried out, and an electron beam column for generating an electron beam and transmitting the beam through the chamber to the region for action on successive layers of fusible powder material, particularly metallic material, to produce an article therefrom. In order to combat the problem of deposition on the window of metal material escaping from the layer as gaseous phase constituents with a boiling point below the melting point of the material, an optical element is arranged in the chamber to intercept such liberated gaseous phase constituents, which in a vacuum environment in the chamber travel along an optical path between the region and the window, and optical element heating means substantially preventing condensation of the intercepted constituents.

12 Claims, 1 Drawing Sheet

(51) Int. Cl.
    *B29C 64/268*    (2017.01)
    *B22F 10/10*     (2021.01)
    *B29C 64/35*     (2017.01)

(56) References Cited

U.S. PATENT DOCUMENTS

| | | | |
|---|---|---|---|
| 2009/0295039 A1* | 12/2009 | Fruth | B29C 64/153 |
| | | | 264/401 |
| 2010/0255213 A1* | 10/2010 | Faber | B82Y 40/00 |
| | | | 427/551 |
| 2011/0061591 A1* | 3/2011 | Stecker | G05B 19/4099 |
| | | | 118/663 |
| 2012/0100031 A1* | 4/2012 | Ljungblad | B23K 15/0013 |
| | | | 419/7 |
| 2014/0294035 A1 | 10/2014 | Oda et al. | |

OTHER PUBLICATIONS

Thomas et al. "High-temperature infrared properties of sapphire, AION, fused silica, yttria, and spinel", 1998, 39, 251-261. (Year: 1998).*

Ralph B. Dinwiddie, et al. "Thermographi in-situ process monitoring of the electron-beam melting technology used in additive manufacturing", Proceeding Optical Diagnostics of Living Cells II, vol. 8705, May 22, 2013 (May 22, 2013), p. 87050K, XP055320134, US ISSN: 0277-786X, DOI: 10.1117/12.2018412 ISBN: 978-1-5106-1324-9.

Sarah K. Everton et al: "Review of in-situ process monitoring and in-situ metrology for metal additive manufacturing", Materials & Design, val. 95, Apr. 1, 2016 (Apr. 1, 2016 ), pp. 431-445, XP055320137, Amsterdam, NL ISSN: 0264-1275, DOI: 10.1016/j.matdes.2016.01.099.

* cited by examiner

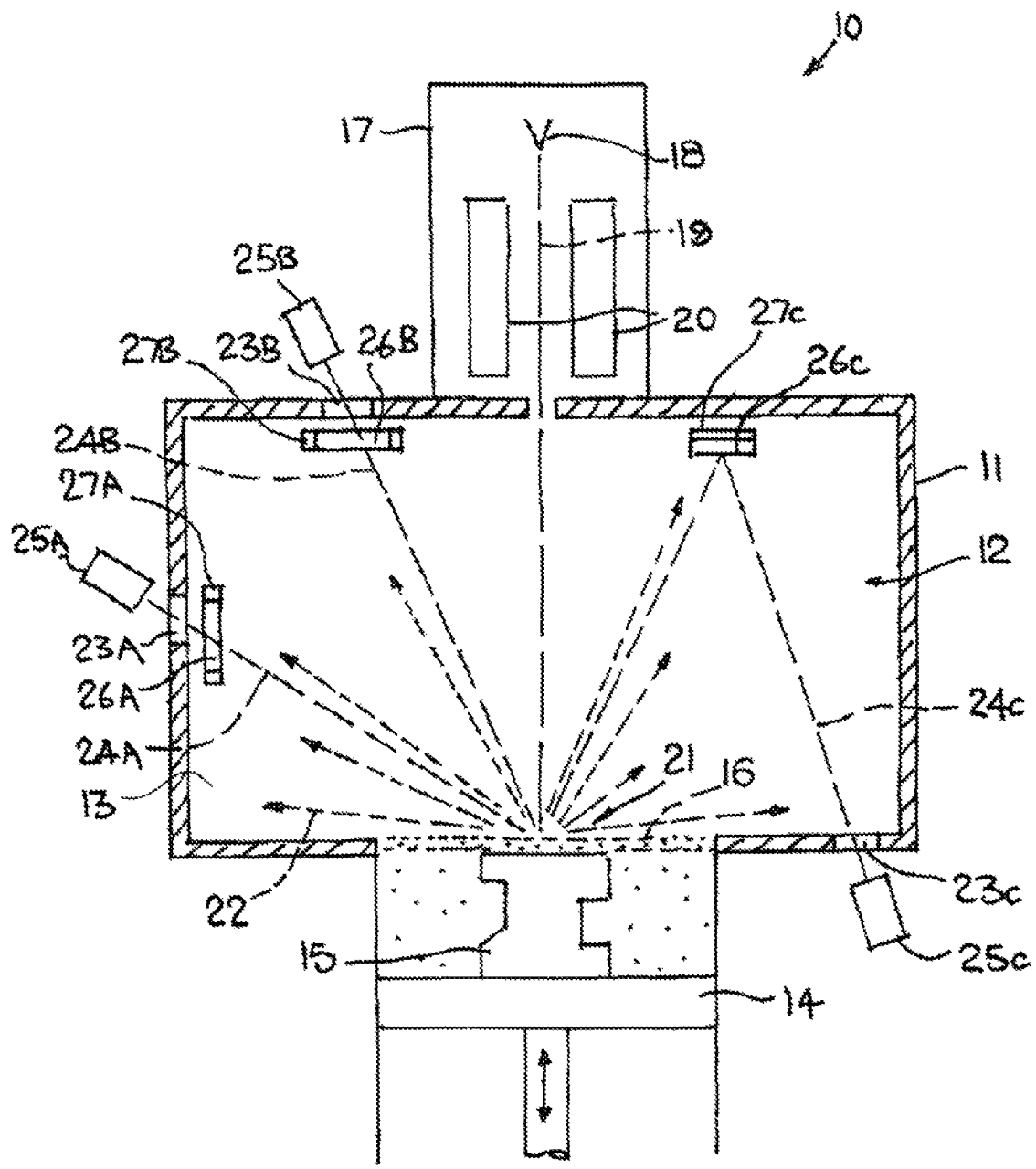

ADDITIVE LAYER MANUFACTURING APPARATUS WITH PROCESS MONITORING FACILITY

CROSS REFERENCE TO RELATED APPLICATIONS

This application is a national stage entry of PCT/GB2018/000003, filed on Jan. 5, 2018, which claims the benefit of priority to GB1701088.5, filed on Jan. 20, 2017, the entirety of both are hereby incorporated by reference herein.

BACKGROUND OF THE INVENTION

Field of the Invention

The present invention relates to additive layer manufacturing apparatus and has particular reference to a facility for monitoring one or more aspects of manufacturing by the apparatus.

Background

Additive layer manufacturing is a manufacturing process in which material is selectively deposited onto a substrate in layers in order to form a three-dimensional article. One of the most prominent technologies employed for this process is powder bed fusion, in which a thin layer of powder—typically metal or plastic—is selectively melted by an energy source such as a laser or electron beam. The melted area of the powder layer forms a cross-sectional part of the article, whereas unmelted powder in the layer is discarded and usually recycled at the end of the process. After each layer has been selectively melted, a new layer of powder is deposited and then also selectively melted so that the complete article is constructed layer-by-layer.

An electron beam consists of a focused stream of high-velocity negatively charged electrons which deliver energy when striking the powder bed. For example, a focused beam of approximately 200 microns diameter may deliver in excess of 1 kilowatt of power to the bed. The beam is produced by a source or gun, for example using thermionic emission, and is accelerated by an acceleration voltage of, for example, 10 kilovolts or more. The beam can be readily steered, focused and shaped using a series of controllable coils producing electromagnetic fields which influence the electrons making up the beam.

When an electron beam is used as the energy source, the process must take place in a vacuum created in a vacuum chamber. If the process were to take place in atmospheric air, the beam electrons would frequently collide with gas molecules in the air, which would dissipate much of the power in the beam and diminish the beam focus, with the consequences of poor resolution and slow processing time. Accordingly, the process is usually carried out in a sub-atmospheric pressure of $10^{-3}$ millibars or lower, which is six orders of magnitude lower than atmospheric pressure. In this environment, the behaviour of the molecules in the air is very different from that at atmospheric pressure. At atmospheric pressure, gas molecules typically travel in a 'random walk', a so-called Brownian Motion, caused by frequent collision of the gas molecules. By contrast, in a high vacuum environment the gas molecules, which are small in number, tend to travel in straight lines until they collide with the walls of the vacuum chamber. Collision of the gas molecules with one another is much less frequent.

A further consideration is that the boiling point of various materials also changes with pressure. In a vacuum the boiling point of many metals is substantially lower than at room temperature. For example, the boiling point of pure aluminium at $10^{-4}$ Torr is 808° C., compared with 2,467° C. at atmospheric pressure. This means that the melting point of some alloys can be above the boiling point of some of their constituent elements at the temperature at which they are being processed by an electron beam. As a result, some of the constituents of an alloy may start to boil in the short period of time in which the melt pool produced by beam energy introduced into a metallic powder layer is still present. Gaseous phase molecules of these constituents emanating from the melt pool due to such boiling will travel in straight lines as described above until they come into contact with a cold surface, where they will either bounce off or condense and remain on the surface. In the latter case, a layer of metallic material will form over time on surfaces in line of sight of the melt pool.

Consequently, due to the high vacuum environment, the high temperatures, the partial pressure of the metallic material being processed, and the described behaviour of molecules in a vacuum, when additive layer manufacturing is carried out with an electron beam anything in line of sight of the melt pool will tend to become coated with metal condensate. Aluminium condensate is a particular problem, due to the partial pressure of molten aluminium and the frequent use of aluminium-containing titanium alloys for certain articles, for example aerospace components, to be produced by additive layer manufacture.

This metal coating of surfaces in the vacuum chamber gives rise to problems when the chamber walls incorporate a window or windows for, in particular, the purpose of monitoring parameters of the manufacturing process. Monitoring, which may need to be carried out continuously during manufacture, embraces not only simple visual inspection, but also metrology of all kinds for such purposes as temperature regulation, control of powder layer depth, consistency and planarity, adherence to predefined article geometry and tolerances in the development of the article, detection of faults and flaws such as porosity, high spots and swelling, and assurance of registration with registration marks, to give but a few examples. Monitoring can be carried out not only by measuring instruments, for example laser interferometers, but also by imaging equipment, for example a camera which records visual spectrum or infrared thermal images. Successful performance of operations of these kinds can be severely compromised by metal deposition on window surfaces, which leads to reduced resolution under progressively increasing window opacity.

Known measures to address the problem include screening an inspection window by sacrificial transparent strip material which has to be advanced as metallisation progresses. The use of this material can also introduce optical distortions and reduces visibility of the process. As the material is sacrificial, it is a consumable which has to be replaced after each build and this introduces additional cost and set-up steps. Consequently, use of the strip material is a workable, but ultimately expensive and time-consuming solution.

It is accordingly the object of the present invention to provide, in additive layer manufacturing apparatus employing an electron beam as the heat source, a facility for monitoring an aspect or aspects of the manufacturing procedure without significant interference by metal deposition on a surface or surfaces participating in the monitoring process.

Other objects and advantages of the invention will be apparent from the following description.

SUMMARY OF THE INVENTION

According to the invention there is provided additive layer manufacturing apparatus comprising a housing bounding a vacuum chamber and having a window for monitoring a region of the chamber in which additive layer manufacturing is to be carried out, electron beam generating and transmitting means for generating an electron beam and transmitting the beam through the chamber to the region for action on successive layers of fusible powder material to produce an article therefrom, an optical element arranged in the chamber to intercept liberated gaseous phase constituents of the material travelling along an optical path between the region and the window, and heating means for heating the optical element to a temperature substantially preventing condensation thereon of the intercepted constituents.

In this apparatus the tendency to build up of a coating of material, for example metallic material in the case of metallic powder material used for layer manufacture of the article, on the surface of the viewing window internally of the vacuum chamber is counteracted by the simple, but effective measure of an optical element positioned to intercept gaseous phase molecules which escape, due to localised boiling of components of the instantaneously processed layer of power material, from that layer and then travel directly towards the window. The optical element is thus positioned on the optical path, which may be straight or optically defined to be angled depending on the location of the window, to function as a protective shield or screen between—in terms of the optical path—the window and the manufacturing region of the chamber. In order to then prevent deposition of the intercepted constituents of the powder material on the optical element itself, in particular by condensation of molecules of the powder on a cold surface of the optical element so that they change from gaseous phase to liquid phase and ultimately back to solid phase, heating means are provided to heat the optical element to a temperature level preventing condensation from taking place, thus a temperature at or above the boiling point of the more volatile constituents of the powder material used. Conversion from gaseous phase at the surface of the optical element thus cannot take place and the element remains entirely or substantially free of a contaminating coating liable to impair its optical characteristics. Location of the optical element in the chamber means can be such that it is thermally insulated, for example by a gap in which the vacuum prevails, from the window and adjacent wall of the housing as well as, if necessary, from components of the apparatus internally of the housing so that it does not represent a disruptive or potentially hazardous high-temperature heat source. Positioning of the optical element entirely within the evacuated area of the housing also has the advantage of reduced thermal loss. In this connection, to avoid optical aberrations ideally the window should be approximately isothermal, so as to avoid differential thermal expansion of different areas of the window. Thermal losses necessarily create a thermal gradient, so that minimising thermal losses makes the window more isothermal.

In one preferred embodiment, the window is arranged in line of sight of a zone of action of the beam in the chamber region and the optical element is optically transmissive and arranged in the optical path to screen the window from the zone. This represents the simplest form of window positioning, but one which exposes the window surface internally of the housing to a high probability of deposition of powder components. In that case, the optical element, which preferably provides low-loss transmission in the infrared spectrum so that it is compatible with the use of imaging or measuring equipment operating on an infrared basis, can be a pane, lens or other such transparent body capable of physically shielding the window from any gas molecules departing the powder material layer in the zone of beam action and travelling towards the window. The size of the optical element in that case should be suitably correlated with that of the window and the element can be positioned close to the window and a wall of the housing so as to minimise intrusion into the chamber space.

In this embodiment, the heating means is preferably arranged at a perimeter of the pane or lens, in particular partly or wholly around the perimeter, so that sufficient area is left free for optical transmission.

In another preferred embodiment the window is arranged out of line of sight of a zone of action of the beam in the chamber region and the optical element is optically reflective or refractive and defines the optical path, which then is angled. This form of window positioning effectively excludes the window from exposure to gas molecules travelling rectilinearly from the powder material layer, but at the cost of a more involved optical path between the zone of beam action and the window. The optical element, which in similar manner to the previous embodiment preferably provides low-loss reflectance or refraction in the infrared spectrum, can be a mirror, prism or other body reflecting or deflecting incident light so that an optical path between the zone of beam action and the optical element is diverted to also run between the optical element and the window remotely positioned in a location selected so that gas molecules cannot directly reach the window by straight-line travel from the powder material layer.

This embodiment allows the heating means to be arranged over a side of the mirror or prism remote from the chamber region, so that optimised heat transfer to and relatively uniform distribution of heat in the optical element may be possible. This permits heating of the optical element with less expenditure of energy.

Permutations of the two embodiments are also possible, for example, in the case of location of the window out of line of sight of the zone of beam action on the powder layer, use of a non-heated mirror or prism to define an angled optical path and provision of a heated optical element in the part of the path between the mirror or prism and the zone of beam action to prevent deposition of condensate on the mirror or prism. This would oblige use of two components instead of one and still has the possibly less thermally effective perimetral location of heating means at the optical element. Moreover, the housing can be provided with a plurality of such windows, in which case a respective such optical element will be associated with each window and respective such heating means provided for heating each optical element. The several windows can be utilised for, in particular, monitoring different aspects of the manufacturing process, for example powder layer temperature, article geometry and specific article faults, each of which may require observation by a different type of monitoring equipment.

The optical element preferably consists of a material having a melting point of and/or substantially unchanged optical characteristics up to at least substantially 700 degrees centigrade, which will ensure that the element is resistant to heat-induced damage, distortion or possible discoloration below the temperature to which the element is likely to be heated to ensure that impinging gas molecules cannot condense.

For preference the apparatus includes monitoring means for monitoring at least one parameter of additive layer manufacture carried out in the chamber, the monitoring means being arranged outside the chamber to monitor via the or each window and respectively associated optical path. The apparatus can then be constructed with, for example, closed loop control in which the results of monitoring by the monitoring means are directly utilised to influence aspects of an ongoing additive layer manufacturing process, such as adjustment of powder material feed, positional adjustment of a support for the article being manufactured and adjustment of control parameters of the electron beam, including beam power, rate of scanning and dwell time on the powder layer. The monitoring means can comprise, for example, a camera for capturing an image within the chamber region or measuring means, such as a laser measuring instrument, for measuring the at least one parameter. These are merely examples of systems that can carry out high-resolution monitoring of one kind or another via window or windows that maintain their clarity by virtue of the measures provided by the invention.

BRIEF DESCRIPTION OF SEVERAL VIEWS OF THE DRAWINGS

An embodiment of the present invention will now be more particularly described by way of example with reference to the accompanying drawing.

FIG. 1, is a schematic elevation of additive layer manufacturing apparatus embodying the invention.

DETAILED DESCRIPTION OF THE ILLUSTRATED EMBODIMENTS

Referring now to FIG. 1, there is shown additive layer manufacturing apparatus 10 comprising a housing 11 bounding a vacuum chamber 12, the housing having the form of a pressure vessel able to be evacuated to provide a sub-atmospheric pressure of $10^{-3}$ millibars or less depending on the specific requirements for a particular manufacturing process. Pumping down to achieve the targeted pressure is by way of a suction pump, which is not illustrated. Manufacturing is carried out in a lower region 13 of the chamber 12, in which an incrementally lowerable table 14 for supporting an article or artefact 15 to be manufactured by an additive layer process, sometimes called 3D printing, is located. In this process, a fusible powder material, especially a metal, is distributed from one or more dispensers or hoppers (not shown), spread in a thin and even layer over the table by a spreading element (also not shown) and selectively melted and fused by the action of heat in a predefined area. The powder material in that area forms, after solidification, a cross-sectional layer of the article. Residual powder material surrounding the area and ultimately the article 15 as a whole plays no further part in the manufacturing process as such and is eventually recovered and recycled. After formation of such a cross-sectional layer of the article the table 14 is lowered by a layer thickness and a further such layer of powder material is distributed over the solidified part of the preceding layer to form, by selective melting and fusing in the same or a different predefined area, a next cross-sectional layer of the article, the process being repeated until construction of the article 15 on a layer-by-layer basis is completed. The numeral 16 in the drawing denotes an instantaneously processed layer, shown with exaggerated thickness, of the powder material over the article 15 in partly constructed form.

The heat for melting the powder material to induce fusion is supplied in this apparatus by an electron beam generated and transmitted by an electron beam column 17 mounted on the housing 11. The column 17 comprises an electron source 18, generally a cathode of electron emissive material capable of emitting electrons under applied voltage, a series of lens for focusing the electrons for propagation as a beam of defined cross-sectional size and shape along an axis 19, and a deflector for deflecting the beam relative to the axis, the lens and deflector being illustrated purely diagrammatically as a unit 20. The deflector is operable under programmed computer control in such a way as to cause the beam to scan the powder layer 16 at high speed to melt powder in an area—a zone of action 21 of the beam—corresponding with a cross-sectional shape of the article 15 as described in the preceding paragraph. The area to be scanned is generally finely resolved into multiple fields scanned one at a time along a predefined path within each field to melt the powder, either on a single visit or preferably by progressive heat build-up from several visits. Additive layer manufacture by this process is generally known and has been described only to the extent necessary for background to the inventive aspect of the apparatus.

As mentioned in the introduction, performance of the process in a vacuum, here in the vacuum chamber 12, has the effect that gas molecules liberated from the layer 16 of metallic powder material travel in the chamber on straight-line trajectories, as indicated in the drawing by arbitrary arrowed lines 22. The escaping molecules emanate from the layer, specifically the zone 21 of action of the electron beam, generally radially in a hemisphere, perceivable in the drawing approximately as radii of a semicircle. As also previously explained, the liberation of gas molecules may arise as a consequence of boiling and thus volatilisation of constituents of the metallic powder material when it is melted to form a melt pool, primarily metal constituents with a boiling point below the melting point of the material, for example aluminium present in a titanium alloy. Any expelled gas molecules contacting a wall surface of the housing 11 or other surface within the chamber are liable to condense and ultimately leave a contaminating deposit of the solid form of the metal constituent on the surface.

Such deposits or coating of metal condensate are an accepted aspect of additive layer manufacturing using an electron beam propagating in a vacuum, but can be problematic in specific circumstances. One particular circumstance is supervision of the manufacturing process, since successful performance of the process usually requires monitoring, preferably on a continuous basis, of one or more parameters of the process, such as those previously mentioned. For the purpose of monitoring, the housing 11 requires a suitably positioned window, which if contaminated with metal condensate may prejudice, inter alia, resolution of imaging by cameras and transmission of measuring beams by measuring instruments. In the case of the apparatus 10 the housing 11 is provided with at least one window pressure-tightly mounted in a wall of the housing, three such windows 23A, 23B and 23C being shown by way of example in the drawing. The number of windows and their disposition can be selected appropriately to need and the drawing shows three in different positions merely by way of arbitrary example. The first window 23A is located in a side wall 11A of the housing and is positioned in line of sight of the zone 21 of action of the beam, in effect the melt pool formed in the layer 16 of powder material by the beam. An optical path between the window 23A and the chamber region 13 in which manufacturing is carried out is schematically indicated by way of an optical axis 24A, here an axis specifically associated with a first externally located imaging or measuring device 25A. The second window 23B is located in a top wall 11B of the housing and similarly positioned in line of sight of the zone 21. An optical path between the window 23B and the region 13 is indicated by an optical axis 24B associated with a second imaging or measuring device 25B. Finally, the third window 23C is located in a bottom wall 11C of the housing and, in this location, is positioned out of line of sight of the zone 21. In this instance an optical path, represented by an optical axis 24C associated with a third imaging or measuring device 25C, between the window 23C and the chamber region 13 is angled or bent as described below.

Each of the windows 23A and 23B in line of sight of the zone 21 of beam action is susceptible to contamination by metal condensate derived from gas molecules as described in the foregoing. In order to substantially eliminate this possibility in the case of the window 23A a first transparent optical element 26A in the form of a pane or lens is arranged in the chamber 12 at a small spacing from the wall 11A to intercept any liberated gas molecules following trajectories 22 directly aimed at the window, thus molecules travelling in straight lines on the optical path centred on the axis 24A. The element 26A is provided with perimetral heating means 27A operable to heat the element to a temperature above that at which an intercepted gas molecule, thus an escaped constituent of the metal powder layer 16, can condense from the gaseous to the liquid phase and after that to solid phase. The intercepted constituent thus remains in gaseous state and whatever subsequently happens to it will not include condensation on the surface of the optical element facing the zone 21. The element is therefore constantly kept free of contaminating metal residue. The spacing of the optical element 26A from the window 23A and wall 11A means that the element is located in the vacuum environment so as to be thermally isolated from the window and wall, which minimises heat loss and avoids direct transmission of heat to the window and any adjacent part of the wall.

Similarly, a second transparent optical element 26B is arranged in corresponding association with the second window 23B to perform the same task of interception and is provided in the same manner with perimetral heating means 27B for the same stated purpose. Accordingly, the explanations with respect to the element 23A and heating means 27A apply equally to the element 23B and heating means 27B.

In the case of, however, the third window 23C out of line of sight of the zone 21 a third optical element 26C which is reflective, such as a mirror, or refractive, such as a prism, is provided in such a location, here adjacent to another part of the top wall 11B, that the element is not only arranged in the optical path represented by the optical axis 24C, but also establishes or defines that path by reflection or refraction. Otherwise, the third optical element 26C performs the same task of interception as the first and second optical elements 26A, 26B and is provided with heating means 27C again for a similar purpose to the heating means 27A, 27B, namely heating the optical element 26C to such a temperature as to prevent condensation of impinging gaseous phase constituents of the metallic powder on the optical entry and exit surface or surfaces of the element. By contrast with the heating means 27A and 27B associated with the transparent optical elements 26A and 26B, the heating means 27C is provided over a greater area of the optical element 26C, such as much or all of the rear face of a mirror or end face of a prism, so as to provide a maximised area of heat input into the element. The resulting more uniform distribution of the supplied heat and elimination of any cold—in relative terms—spot or area provides greater heating efficiency and scope for continuous operation of the heating means with reduced energy consumption for the same heating performance.

The optical elements 24A, 24B and 24C can be mounted by any suitable means, for example spacer arms, struts or blocks of metal, ceramic or other appropriate material to locate the elements securely relative to, but at a spacing from, the respectively associated housing walls. The mounting means can be relatively thermally insulating so as to reduce thermal losses and thermal gradients and thus thermally induced distortions of the optical element.

It is to be emphasised that such details as housing shape and specific window location or locations in the described and illustrated embodiment are given merely by way of example and that the essential requirements are for the window or windows to be sited so as to permit surveillance, whether visually or by suitable equipment and whether by way of a direct or an indirect line of sight, of the region, either partial or whole, where additive layer manufacturing is carried out by electron beam action in a vacuum environment and for such a window or each such window or at least one of such windows to be screened from targeting gas molecules by an optical element, whether optically transmissive, reflective or refractive, heatable in use to above the condensation temperature of incident gas molecules. Additive layer manufacturing apparatus with these features thus incorporates a facility for process monitoring with an at least substantial degree of immunity from the otherwise likely gradual loss of resolution of the monitoring path or other impairment of the integrity of the process monitoring.

The invention claimed is:

1. Additive layer manufacturing apparatus comprising:
    a vacuum chamber having a chamber region in which additive layer manufacturing is to be carried out,
    a housing bounding said vacuum chamber and having a first window for monitoring the chamber region and said additive layer manufacturing,
    an electron beam column for generating an electron beam and transmitting the beam through the vacuum chamber to the chamber region for action on successive layers of fusible powder material to produce an article therefrom,
    an optical element arranged in the chamber region to intercept liberated gaseous phase constituents of the material travelling along an optical path between the chamber region and the window,
    said optical element being positioned within the vacuum chamber on the optical path to function during monitoring via the window as a protective shield or screen between the chamber region and the window,
    and a heating means for heating the optical element to a temperature substantially preventing condensation thereon of the intercepted constituents;
    wherein the window is arranged in line of sight of a zone of action of the beam in the chamber region and the optical element is optically transmissive and arranged in the optical path to screen the window from the zone.

2. The apparatus according to claim 1, wherein the optical element provides transmission in an infrared spectrum.

3. The apparatus according to claim 1, wherein the optical element is a pane or lens.

4. The apparatus according to claim 3, wherein the heating means is arranged at a perimeter of the pane or lens.

5. Additive layer manufacturing apparatus comprising:
a vacuum chamber having a chamber region in which additive layer manufacturing is to be carried out,
a housing bounding said vacuum chamber and having a first window for monitoring the chamber region and said additive layer manufacturing,
an electron beam column for generating an electron beam and transmitting the beam through the vacuum chamber to the chamber region for action on successive layers of fusible powder material to produce an article therefrom,
an optical element arranged in the chamber region to intercept liberated gaseous phase constituents of the material travelling along an optical path between the chamber region and the window,
said optical element being positioned within the vacuum chamber on the optical path to function during monitoring via the window as a protective shield or screen between the chamber region and the window, and
a heating means for heating the optical element to a temperature substantially preventing condensation thereon of the intercepted constituents;
wherein the window is arranged out of line of sight of a zone of action of the beam in the chamber region and the optical element is optically reflective or refractive and defines the optical path; and
wherein the optical element is a mirror or prism.

6. The apparatus according to claim 5, wherein the heating means is arranged over a side of the mirror or prism remote from the chamber region.

7. The apparatus according to claim 1, wherein the housing comprises a plurality of windows including said first window and the apparatus comprises a plurality of optical elements, wherein each window of said plurality of windows has an associated heating means for heating each optical element of the plurality of optical elements.

8. The apparatus according to claim 1, wherein the optical element consists of a material having a melting point of at least 700 degrees centigrade.

9. The apparatus according to claim 1, wherein the optical element consists of a material having substantially unchanged optical characteristics up to at least 700 degrees centigrade.

10. The apparatus according to claim 1, comprising monitoring means for monitoring at least one parameter of additive layer manufacture carried out in the chamber region, the monitoring means being arranged outside the vacuum chamber to monitor via the window and the optical path; said monitoring means comprising a camera for capturing an image within the chamber region.

11. The apparatus according to claim 1, comprising monitoring means for monitoring at least one parameter of additive layer manufacture carried out in the chamber region, the monitoring means being arranged outside the vacuum chamber to monitor via the window and the optical path, said monitoring means comprising a laser measuring instrument.

12. The apparatus according to claim 5, wherein the optical element provides reflectance or refraction in an infrared spectrum.

* * * * *